(12) United States Patent
Wei et al.

(10) Patent No.: US 12,525,022 B2
(45) Date of Patent: Jan. 13, 2026

(54) CAMERA MONITORING SYSTEM INCLUDING TRAILER PRESENCE DETECTION USING OPTICAL FLOW

(71) Applicant: Stoneridge, Inc., Novi, MI (US)

(72) Inventors: Wenpeng Wei, East Lansing, MI (US); Liang Ma, Rochester, MI (US); Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 57 days.

(21) Appl. No.: 18/463,421

(22) Filed: Sep. 8, 2023

(65) Prior Publication Data

US 2024/0087331 A1    Mar. 14, 2024

Related U.S. Application Data

(60) Provisional application No. 63/405,152, filed on Sep. 9, 2022.

(51) Int. Cl.
*G06V 20/56* (2022.01)
*G06V 10/25* (2022.01)
*H04N 21/234* (2011.01)

(52) U.S. Cl.
CPC ............ *G06V 20/56* (2022.01); *G06V 10/25* (2022.01); *H04N 21/23424* (2013.01)

(58) Field of Classification Search
CPC ... G06V 20/56; G06V 10/25; H04N 21/23424
See application file for complete search history.

(56) References Cited

U.S. PATENT DOCUMENTS

| 9,975,487 B2* | 5/2018 | Lewis .................... H04N 7/183 |
| 10,000,155 B2 | 6/2018 | Schrepfer et al. |
| 10,496,892 B2* | 12/2019 | Son ...................... B62D 15/021 |
| 10,529,238 B2 | 1/2020 | Gesch et al. |
| 10,703,279 B2 | 7/2020 | Dupuis et al. |

(Continued)

FOREIGN PATENT DOCUMENTS

| DE | 102016009330 | 2/2017 |
| DE | 102016208199 | 11/2017 |

(Continued)

OTHER PUBLICATIONS

International Search Report and Written Opinion for International Patent Application No. PCT/US2023/032241 dated Nov. 28, 2023.

(Continued)

*Primary Examiner* — Timothy R Newlin
(74) *Attorney, Agent, or Firm* — Carlson, Gaskey & Olds, P.C.

(57) ABSTRACT

A method for detecting a trailer presence includes identifying a region of interest within a video feed from one or more cameras secured to a vehicle. The video feed depicts a scene having a first pixel area, and the region of interest corresponds to a portion of the scene having a second pixel area that is less than the first pixel area. The method also includes determining an optical flow within the region of interest, and determining that a trailer is connected to the vehicle in response to the optical flow within the region of interest matching a predetermined pattern corresponding to a connected trailer. A camera monitoring system for a vehicle is also disclosed.

16 Claims, 5 Drawing Sheets

(56) References Cited

U.S. PATENT DOCUMENTS

| | | | |
|---|---|---|---|
| 10,960,822 B2* | 3/2021 | Baur | B60R 1/12 |
| 11,066,014 B1* | 7/2021 | Schondorf | H04N 21/41422 |
| 11,127,301 B1 | 9/2021 | Lai et al. | |
| 11,216,675 B2 | 1/2022 | Shashua et al. | |
| 11,279,284 B2 | 3/2022 | Pereira et al. | |
| 11,285,875 B2* | 3/2022 | Lu | B60R 1/26 |
| 11,345,280 B2* | 5/2022 | Berne | B60R 11/04 |
| 2009/0027787 A1 | 1/2009 | Perkes | |
| 2009/0303024 A1* | 12/2009 | Asari | B60Q 1/484 |
| | | | 340/425.5 |
| 2010/0085652 A1 | 4/2010 | Crouse | |
| 2018/0253608 A1* | 9/2018 | Diessner | G06V 10/44 |
| 2019/0061626 A1* | 2/2019 | Dupuis | B60R 1/025 |
| 2019/0225154 A1* | 7/2019 | Ionascu | G06F 18/256 |
| 2019/0258874 A1 | 8/2019 | Zhang et al. | |
| 2019/0297233 A1* | 9/2019 | Gali | G06T 7/248 |
| 2019/0392192 A1* | 12/2019 | Dubey | G06V 10/50 |
| 2020/0286244 A1* | 9/2020 | Freeman-Powell | G06T 7/174 |
| 2020/0317127 A1 | 10/2020 | Archer | |
| 2021/0023996 A1* | 1/2021 | Lu | B60R 1/28 |
| 2021/0094473 A1* | 4/2021 | Gali | B60R 1/26 |
| 2021/0170947 A1* | 6/2021 | Yunus | B60R 1/26 |
| 2021/0209725 A1* | 7/2021 | Humbert | G06V 10/803 |
| 2021/0221363 A1 | 7/2021 | Lai et al. | |
| 2021/0379944 A1* | 12/2021 | Reed | B60R 16/023 |
| 2022/0027644 A1 | 1/2022 | Gali et al. | |
| 2022/0097713 A1* | 3/2022 | Neubecker | B60W 40/02 |
| 2022/0153195 A1* | 5/2022 | Freeman-Powell | G06T 7/33 |
| 2022/0219607 A1* | 7/2022 | Freeman-Powell | B60W 50/14 |
| 2023/0064558 A1* | 3/2023 | Griffin | B60K 35/28 |
| 2023/0230387 A1* | 7/2023 | Herman | G06V 20/56 |
| | | | 701/25 |

FOREIGN PATENT DOCUMENTS

| | | |
|---|---|---|
| DE | 102017100669 | 7/2018 |
| DE | 102017208592 | 11/2018 |
| DE | 102017115582 | 1/2019 |
| DE | 102019134965 | 6/2021 |
| EP | 3321130 | 5/2018 |
| EP | 3922528 | 12/2021 |
| WO | 2022140162 | 6/2022 |

OTHER PUBLICATIONS

International Preliminary Report on Patentability for International Patent Application No. PCT/US2023/032241 dated Mar. 20, 2025.

\* cited by examiner

CAMERA MONITORING SYSTEM INCLUDING TRAILER PRESENCE DETECTION USING OPTICAL FLOW

RELATED APPLICATIONS

This application claims the benefit of U.S. Provisional Application No. 63/405,152, filed Sep. 9, 2022, the disclosure of which is incorporated herein by reference in its entirety.

TECHNICAL FIELD

This disclosure relates to a camera monitoring system (CMS) for a vehicle, and specifically to a process for determining a presence of a trailer using the CMS.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the camera systems cover a larger field of view than a conventional mirror, or include views that are not fully obtainable via a conventional mirror.

In addition to mirror replacement, the images provided via the cameras in the CMS can be utilized to detect aspects of the environment and aspects of the vehicle in an image-processing-based detection process. Among the aspects of the vehicle that can be detected are trailer properties. The trailer properties can then be utilized for any number of systems including attentive driving detection, automated driving features, semi-automated driver assist features, jackknife warnings, and any similar elements.

Accurate detection of trailer properties using image-processing-based perception can be one important feature of the tractor-trailer systems described above. However, the image-processing-based perception is computationally intensive. Operating the image-based-perception to detect trailer properties when no trailer is attached can result in wasted processing power that could be utilized for other purposes within the camera monitoring system.

These and other features of the present invention can be best understood from the following specification and drawings, the following of which is a brief description.

SUMMARY

A method for detecting a trailer presence according to an example embodiment of the present disclosure includes identifying a region of interest within a video feed from one or more cameras secured to a vehicle. The video feed depicts a scene having a first pixel area, and the region of interest corresponds to a portion of the scene having a second pixel area that is less than the first pixel area. The method also includes determining an optical flow within the region of interest, and determining that a trailer is connected to the vehicle in response to the optical flow within the region of interest matching a predetermined pattern corresponding to a connected trailer.

In a further embodiment of the foregoing embodiment, the one or more cameras include a first camera and a second camera; and the method includes generating the video feed by stitching a first video feed from the first camera and a second video feed from the second camera together at a stitching interface.

In a further embodiment of any of the foregoing embodiments, the first video feed and the second video feed are mirror replacement video feeds.

In a further embodiment of any of the foregoing embodiments, the first video feed is a driver side rearview mirror replacement video feed. The second video feed is a passenger side rearview mirror replacement video feed.

In a further embodiment of any of the foregoing embodiments, a horizontal width of the region of interest is less than a full horizontal width of the video feed; and the region of interest includes a portion of the stitching interface.

In a further embodiment of any of the foregoing embodiments, a vertical height of the region of interest is less than a full vertical height of the video feed.

In a further embodiment of any of the foregoing embodiments, the method includes determining a set of one or more operating conditions of the vehicle, wherein the identifying the region of interest within the video feed is performed based on the set of one or more operating conditions of the vehicle.

In a further embodiment of any of the foregoing embodiments, the region of interest is centered on an expected position of the trailer within the video feed, and the expected position is based on the one or more determined operating conditions.

In a further embodiment of any of the foregoing embodiments, the one or more operating conditions include a steering angle of the vehicle.

In a further embodiment of any of the foregoing embodiments, the one or more operating conditions include a speed of the vehicle.

In a further embodiment of any of the foregoing embodiments, the region of interest is centered on the stitching interface while the speed of the vehicle is above a predefined threshold speed and the steering angle of the vehicle is less than or equal to a predefined threshold steering angle.

In a further embodiment of any of the foregoing embodiments, the threshold speed is 9-11 miles per hour and the threshold steering angle is 4-6 degrees.

In a further embodiment of any of the foregoing embodiments, the method does not determine an optical flow outside of the region of interest.

In a further embodiment of any of the foregoing embodiments, the method includes outputting a trailer connected notification in response to determining the trailer is connected to the vehicle.

A camera monitoring system for a vehicle according to an example embodiment of the present disclosure includes at least one camera defining a rear facing field of view and a controller connected to the at least one camera such that a video feed generated by the camera is provided to the controller. The controller includes a processor and a memory. The memory stores instructions configured to cause the controller to identify a region of interest within the video feed, wherein the video feed depicts a scene having a first pixel area, and the region of interest corresponds to a portion of the scene having a second pixel area that is less than the first pixel area. The memory also stores instructions configured to cause the controller to determine an optical flow within the region of interest, and determine that a trailer is connected to a vehicle in response to the optical flow within the region of interest matching a predetermined pattern corresponding to a connected trailer.

In a further embodiment of the foregoing embodiment, the at least one camera defining a rear facing field of view includes a first mirror replacement camera and a second mirror replacement camera.

In a further embodiment of any of the foregoing embodiments, the one or more cameras include a first camera and a second camera, the first video feed is a driver side rearview mirror replacement video feed, the second video feed is a passenger side rearview mirror replacement video feed, and the controller is configured to generate the video feed by stitching a first video feed from the first camera and a second video feed from the second camera together at a stitching interface.

In a further embodiment of any of the foregoing embodiments, a horizontal width of the region of interest is less than a full horizontal width of the video feed, and the region of interest includes a portion of the stitching interface.

In a further embodiment of any of the foregoing embodiments, a vertical height of the region of interest is less than a full vertical height of the video feed.

In a further embodiment of any of the foregoing embodiments, the controller is configured to determine a set of one or more operating conditions of the vehicle, and perform the identification of the region of interest within the video feed based on the set of one or more operating conditions of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1A:
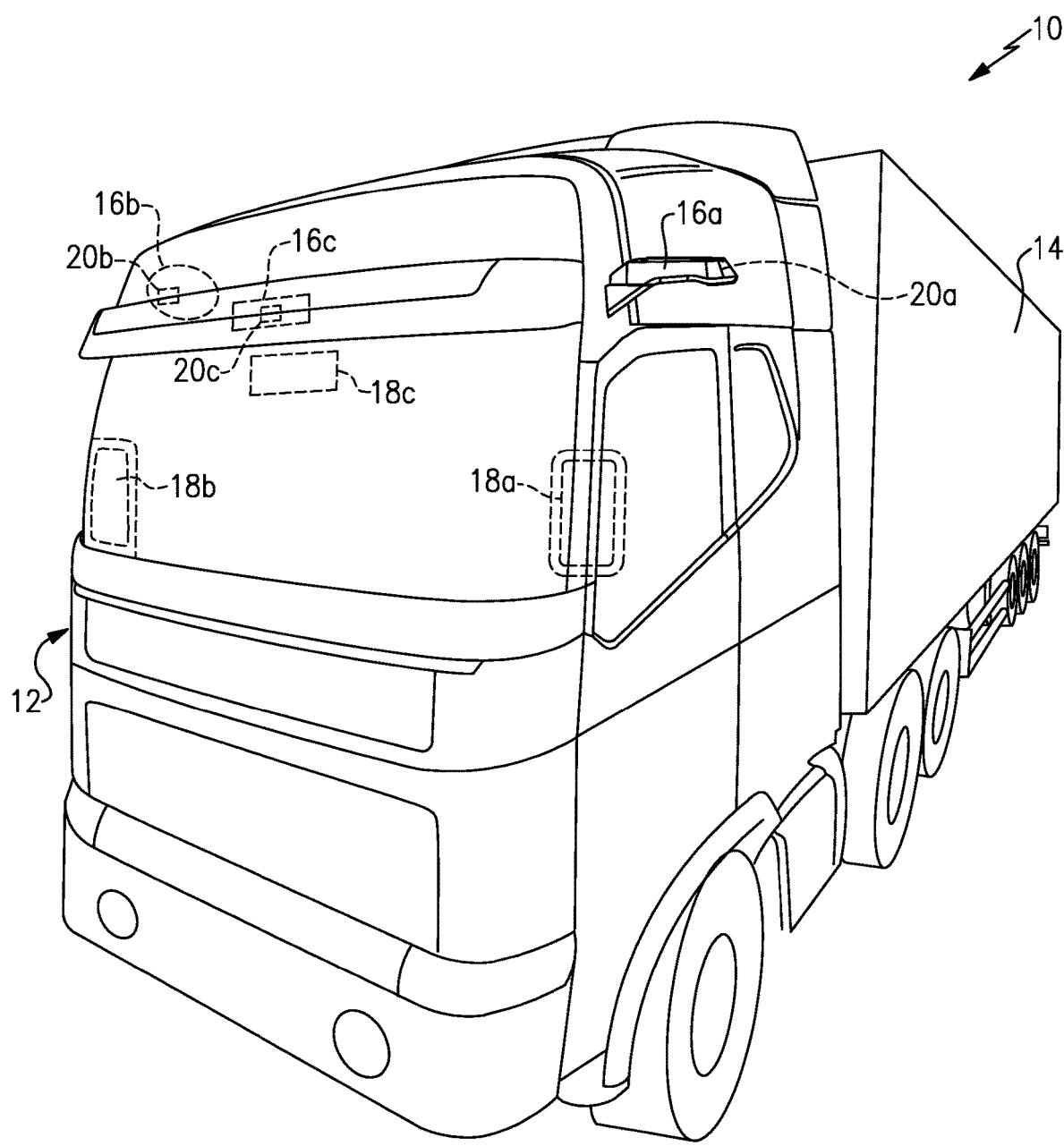
FIG. 1A is a schematic front view of a commercial truck with a camera monitoring system (CMS) used to provide at least Class II and Class IV views.
Figure 1B:
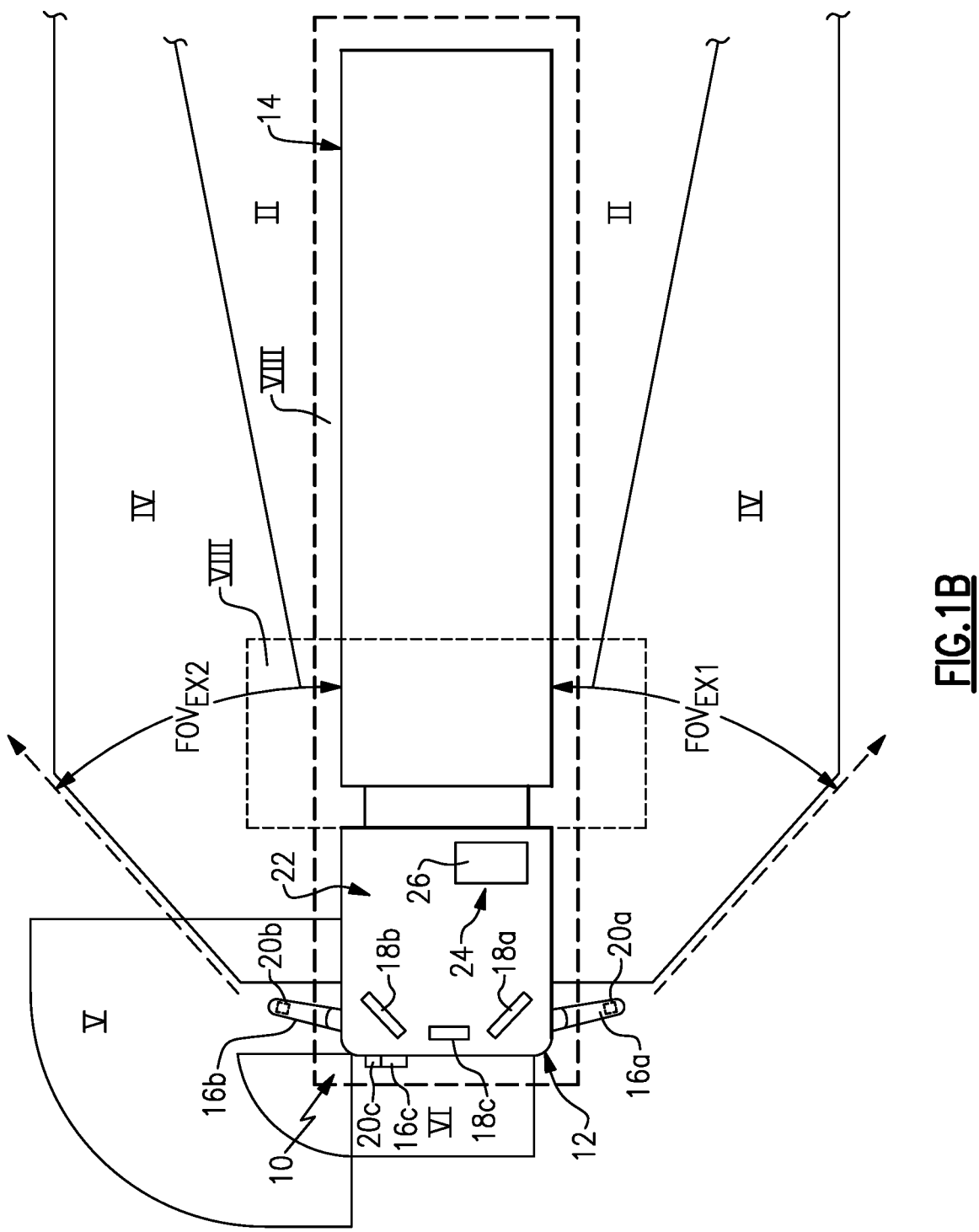
FIG. 1B is a schematic top elevational view of a commercial truck with a camera monitoring system providing Class II, Class IV, Class V and Class VI views.
Figure 2:
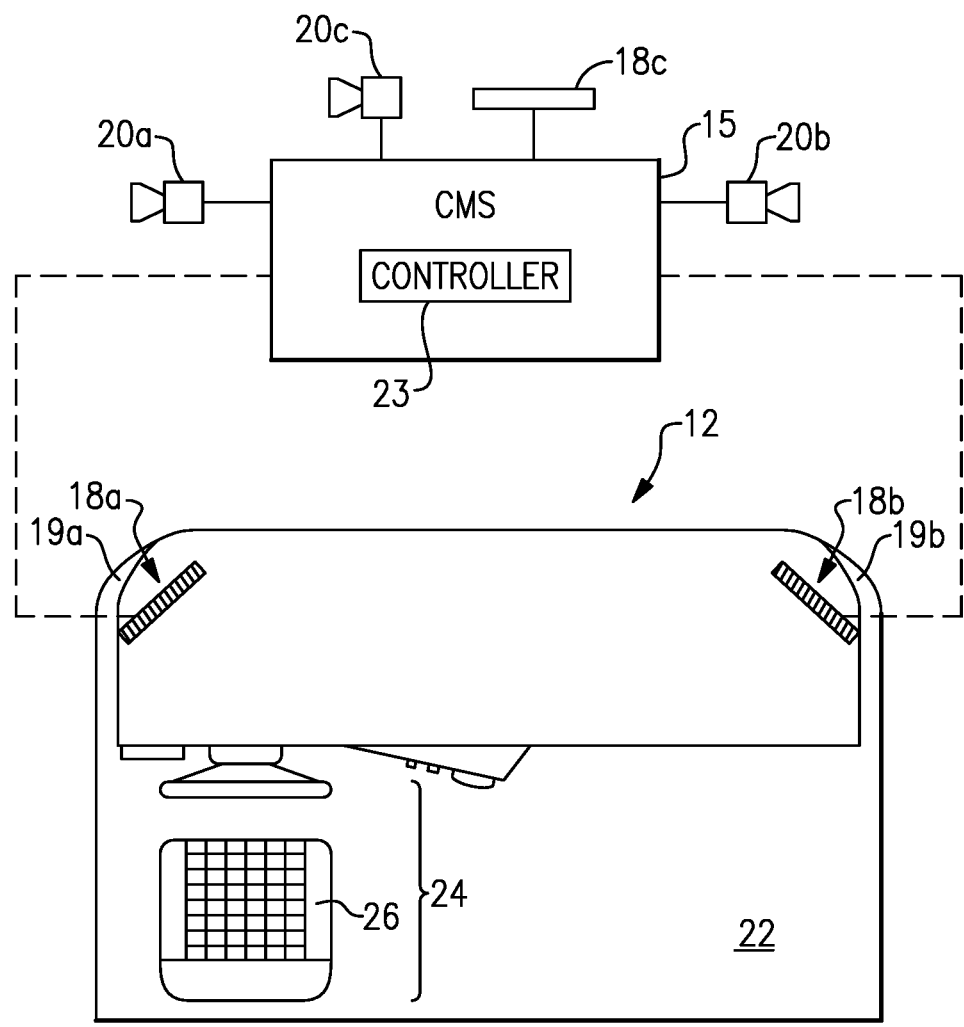
FIG. 2 is a schematic top perspective view of a vehicle cabin including displays and interior cameras.
Figure 3:
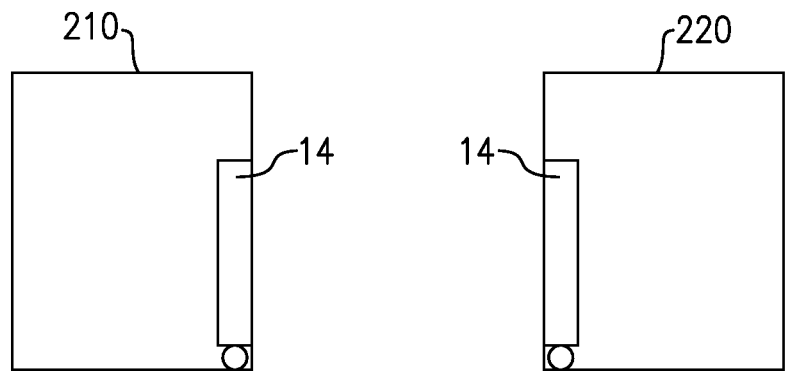
FIG. 3 illustrates images received from CMS cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitoring system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 may be used to entirely replace conventional mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively on or within the camera arms 16a, 16b. The cameras 20a, 20b are secured to the commercial vehicle 10 through the camera arms 16a, 16b. However, it is understood that the cameras 20a, 20b could be secured to the commercial vehicle in other ways. The exterior cameras 20a, 20b respectively provide an exterior field of view $FOV_{EX1}$, $FOV_{EX2}$ that each include at least one of Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views is also desired, a camera housing 16c and camera 20c may be arranged at or near the front of the vehicle 10 to provide those views (FIG. 1B). A third display 18c arranged within the cab 12 near the top center of the windshield may be used to display the Class V and Class VI views, which are toward the front of the vehicle 10, to a driver in the driver seat 26.

If video of class VIII views is desired, camera housings can be disposed at the sides and rear of the vehicle 10 to provide fields of view including some or all of the class VIII zones of the vehicle 10. In such examples, the third display 18c may include one or more frames displaying the class VIII views. Alternatively, additional displays can be added near the first, second and third displays 18a, 18b, 18c and provide a display dedicated to providing a class VIII view. The displays 18a, 18b, 18c face a driver region 24 within the cabin 22 where a driver is seated on the driver seat 26.

The CMS includes a controller 23 that includes a processor and a memory that stores instructions for configuring the controller. The processor may include one or more microprocessors, microcontrollers, application specific integrated circuits (ASICs), or the like, for example. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

FIGS. 3-6 illustrate a pair of images 210, 220 received from the wing mounted cameras 20a, 20b. When a trailer 14 is connected to the cab 12, the field of view defined by at least one of the cameras 20a, 20b includes an image of the trailer 14. When the vehicle 10 is traveling in a forward direction at a speed above a threshold, the trailer 14 is within the field of view of both cameras 20a, 20b and will appear in both images 210, 220 as in the illustrated example. In a practical example, the images 210, 220 are generated using a rearview mirror replacement portion of the CMS 15, although alternative examples may be used to the same effect.

Figure 4:
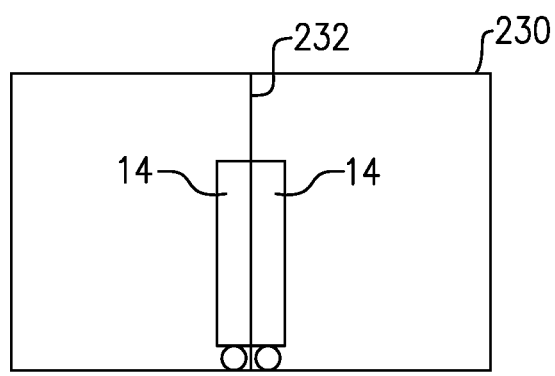
FIG. 4 illustrates a stitched image derived from the images of FIG. 3.

The CMS 15 uses a stitching algorithm to merge the images 210, 220 into a single image 230 illustrated in FIG. 4. The single image 230 is joined at a stitching interface 232. The stitching interface 232 is algorithmically determined according to any stitching methodology. In some examples, the stitching interface 232 is a straight, vertical edge of the images 210, 220. In alternative examples, the stitching interface 232 may crop one or both images 210, 220. In yet further alternatives, the stitching interface 232 may be determined using neural network based algorithms and may not be a straight line interface.

Figure 5:
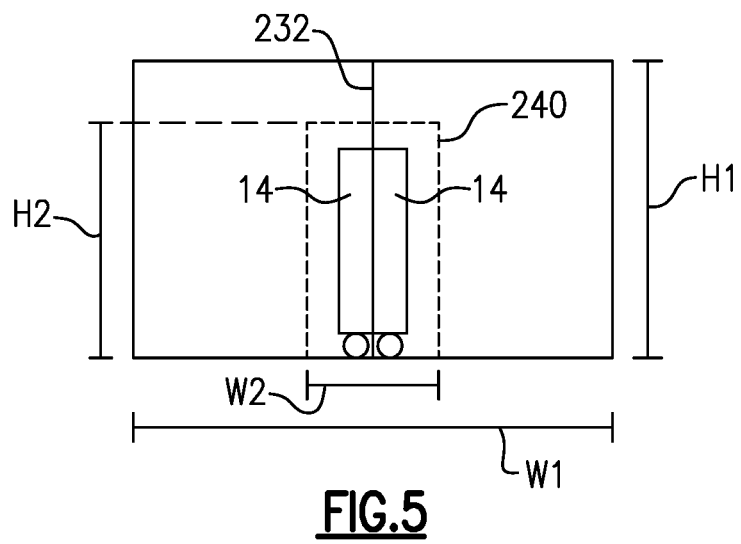
FIG. 5 illustrates inclusion of a region of interest in the stitched image of FIG. 4.
Figure 6:
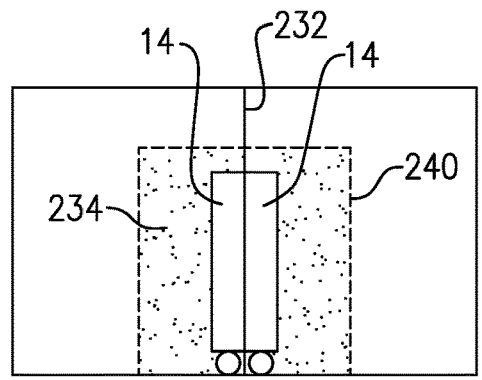
FIG. 6 illustrates an optical flow analysis of the region of interest of FIG. 5.
Figure 7:
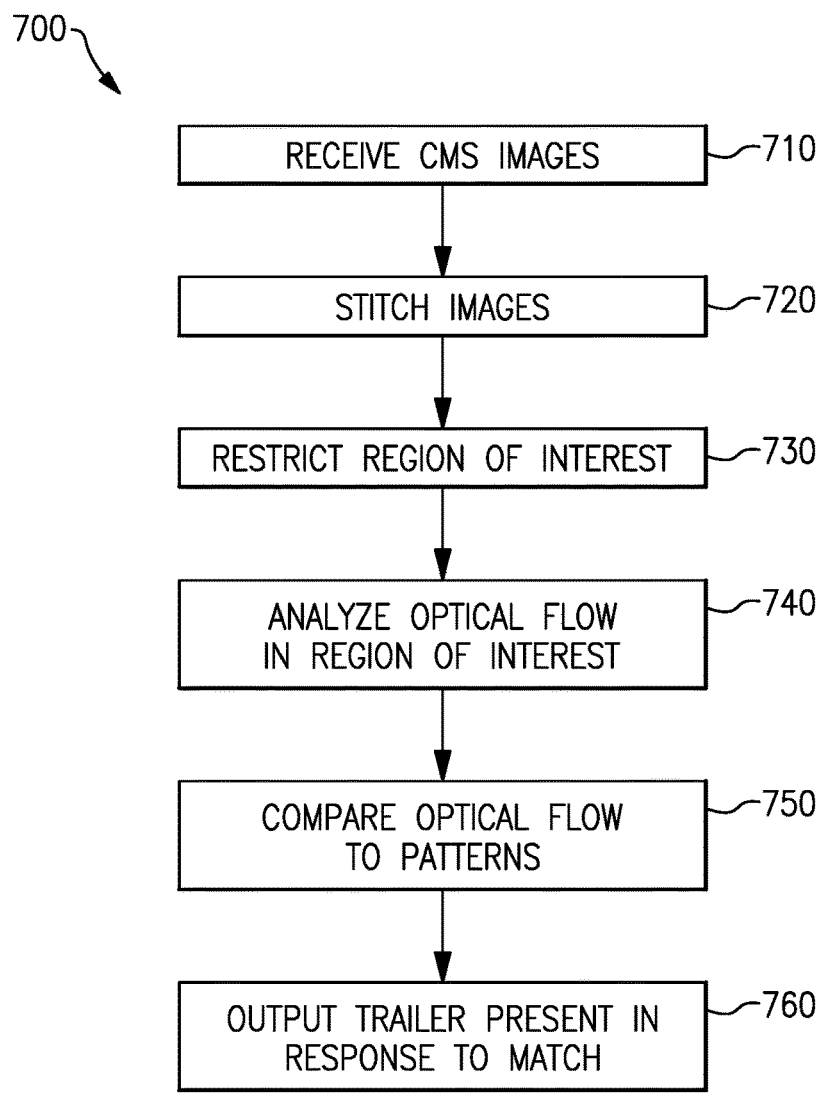
FIG. 7 illustrates a process for identifying a presence of a trailer using optical flow within the region of interest.

Once the images 210, 220 are stitched together into the single image 230, a region of interest 240 is defined within the single image 230. The region of interest 240 is limited to an area of the single image 230 where a trailer 14 is expected to appear within the image 230 based on the current vehicle operating features if a trailer 14 is present. The single image 230 depicts a scene having a first pixel area (having a vertical height H1 and a horizontal width W1). The illustrated region of interest 240 in FIG. 5 is a rectangle that corresponds to a portion of the scene/single image 230 having a second pixel area (having a vertical height H2 and a horizontal width W2) that is less than the first pixel area. In the example of FIG. 5, the region of interest 240 is less than a full horizontal width W1 and less then a full vertical height H1 of the single image 230 (i.e., H2<H1 and W2<W1). The exemplary region of interest 240 corresponds to the vehicle 10 travelling in a forward direction above a predefined threshold speed (e.g., 10 mph), with a steering angle below a predefined threshold steering angle. In one example, the predefined threshold speed is 9-11 mph (i.e., greater than or equal to 9 mph and less than or equal to 11 mph). In a further example, the predefined threshold speed is 10 mph. In one example, the predefined threshold steering angle is 4-6 degrees (i.e., greater than or equal to 4 degrees and less than or equal to 6 degrees. In a further example, the predefined threshold steering angle is 5 degrees. When the operating conditions are different, the region of interest 240 may be defined in an alternate location (e.g., when the steering angle is above the predefined threshold steering angle, the region of interest may be shifted in the direction of the steering and/or may be enlarged horizontally).

In alternate examples, when the forward straight driving condition is not met, the trailer presence function may be disabled entirely in order to save processing resources.

Once the region of interest 240 has been established, the CMS 15 performs an optical flow analysis within the region of interest 240. In order to save processing power and prevent wasted computations, the optical flow analysis is limited to only the region of interest 240.

Optical flow is a concept referring to a pattern of apparent motion of objects, surfaces, and edges in a visual scene caused by the relative motion between an observer and a scene. Optical flow can also be described as the distribution of apparent velocities of movement of a brightness pattern in an image. The CMS 15 measures the pixel velocity 234 within the region of interest 240 (see FIG. 6) and compares the pattern of pixel velocity to known patterns corresponding to the presence of a trailer 14. By way of example, when a trailer 14 is present, the portion of the image including the trailer 14 will have minimal optical flow, as the trailer 14 is mostly static relative to the tractor, and the portion of the image not including the trailer 14 will have a standard optical flow corresponding to the rate of movement of the vehicle. By defining the region of interest 240 slightly larger than the expected size of the trailer 14 and centering the region of interest 240 on the trailer 14, the CMS 15 can capture this distinction without requiring the optical flow of the entire image 230 to be analyzed. In another example, road and engine vibrations can cause the vertical rear edges of the trailer 14 to oscillate, resulting in an optical flow at the edges of the trailer with the shape of a waveform.

The specific movement of the optical flow and/or the areas of the region of interest where the shape of the optical flow changes are referred to as the pattern of pixel velocity, and these portions are what is compared to patterns known to correspond to a presence of a trailer 14.

When the pattern of pixel velocity within the region of interest 240 matches a pattern of pixel velocity corresponding to the presence of a trailer 14, the system determines that a trailer is present and connected to the cab 12. When the pattern of pixel velocity within the region of interest 240 does not match to a pattern of pixel velocity corresponding to the presence of a trailer 14, the CMS 15 determines that no trailer 14 is connected to the cab 12.

With continued reference to FIGS. 1-6, FIG. 7 illustrates a method 700 of operating the CMS 15 for performing the above described operations. Initially the CMS 15 receives images from the cameras 20a, 20b in a "Receive CMS Images" step 710. The received images are stitched together using any established stitching algorithm in a "Stitch Images" step 720. In instances where the method is being performed using images from a single camera 20a or 20b, rather than multiple cameras, the stitch images step 720 can be omitted. Similarly, when images are being provided from additional cameras beyond the wing mounted rearview cameras 20a, 20b the stitch images step 720 may use the stitching algorithm to combine all of the images into a single stitched image.

Once a single image is created, the CMS 15 defines a region of interest within the image in a "Restrict Region of Interest" step 730. The region of interest is less than all of the image (i.e., corresponds to a portion of the entire image that has a pixel area less than the pixel area of the entire image), and corresponds to the area where the trailer 14 is expected to be within the image. In order to facilitate this identification, the CMS 15 can, in some examples, receive operating characteristics of the vehicle 10 that can indicate an expected location of the trailer 14 within the images. By way of example, the operating characteristics may include (but are not limited to) a steering angle of the vehicle 10 and a speed of the vehicle 10.

The region of interest can be restricted to less than all of the horizontal portion of the image, less than all of the vertical portion of the image, less than all of both the horizontal and the vertical portion of the image, and/or a specific box defining the restricted region. In some examples, the region may be centered on the stitching interface joining the images into a single image. In other examples, the region may be shifted off-center, but still include the stitching interface 232 joining the multiple images into a single image.

After the region of interest has been defined, the CMS 15 analyzes the optical flow within the region of interest in a "Analyze Optical Flow In Region of Interest" step 740. In order to save computational resources, and provide for a quicker determination, the optical flow is analyzed only within the region of interest. The analysis identifies any patterns of optical flow that exist within the region of interest. The optical flow patterns are compared to known patterns in a "Compare Optical Flow to Patterns" step 750. When the identified patterns of optical flow match a pattern known to correspond to a trailer being present, the method 700 outputs a "trailer present" signal to the CMS 15 in an "Output Trailer Present In response to Match" step 760. Conversely, when the patterns do not match a pattern known to correspond with a trailer 14 being present, a "no trailer present" signal is output.

After being informed about the presence, or lack of presence, of a trailer 14, the CMS 15 operates in a conventional manner corresponding to the trailer 14 connected status. In addition, the CMS 15 can provide the trailer detected status to any number of additional vehicle systems that may utilize this information. By way of example, the additional systems can include driver assist systems, object detection systems, and the like.

While described above as a process within the CMS 15, it is appreciated that the process for trailer detection using optical flow can be performed independently of the CMS 15 and provided to the CMS 15, performed in a general vehicle controller, or performed in any suitable processing unit within the vehicle.

Although an example embodiment has been disclosed, a worker of ordinary skill in this art would recognize that certain modifications would come within the scope of the claims. For that reason, the following claims should be studied to determine their true scope and content.

What is claimed is:

1. A method for detecting a trailer presence, comprising:
   stitching a first video feed from a first camera and a second video feed from a second camera together at a stitching interface to generate a stitched video feed that is a panoramic and is wider than each of the first video feed and the second video feed individually, wherein the first camera and second camera are disposed on opposing sides of a commercial vehicle and have respective rear-facing fields of view;
   identifying a region of interest within the stitched video feed, wherein the stitched video feed depicts a scene having a first pixel area, and the region of interest corresponds to a portion of the scene having a second pixel area that is less than the first pixel area;
   determining an optical flow within the region of interest; and
   determining that a trailer is connected to the vehicle in response to the optical flow within the region of interest matching a predetermined pattern of apparent motion corresponding to a connected trailer.

2. The method of claim 1, wherein:
   a horizontal width of the region of interest is less than a full horizontal width of the stitched video feed; and
   the region of interest includes a portion of the stitching interface.

3. The method of claim 2, wherein a vertical height of the region of interest is less than a full vertical height of the stitched video feed.

4. The method of claim 1, comprising:
   determining a set of one or more operating conditions of the vehicle;
   wherein said identifying the region of interest within the stitched video feed is performed based on the set of one or more operating conditions of the vehicle.

5. The method of claim 4, wherein the region of interest is centered on an expected position of the trailer within the stitched video feed, and the expected position is based on the one or more determined operating conditions.

6. The method of claim 4, wherein the one or more operating conditions include a steering angle of the vehicle.

7. The method of claim 6, wherein the one or more operating conditions include a speed of the vehicle.

8. The method of claim 1, wherein the region of interest is less than a full vertical height of the stitched video feed.

9. A method for detecting a trailer presence comprising:
   determining a set of operating conditions of the vehicle, wherein the set of one or more operating conditions includes a steering angle of the vehicle and a speed of the vehicle;
   generating a stitched video feed by stitching a first video feed from a first camera and a second video feed from a second camera together at a stitching interface, wherein the first and second cameras are secured to a vehicle;
   identifying a region of interest within the stitched video feed, wherein the stitched video feed depicts a scene having a first pixel area, and the region of interest corresponds to a portion of the scene having a second pixel area that is less than the first pixel area, the identifying based on the set of operating conditions;
   determining an optical flow within the region of interest; and
   determining that a trailer is connected to the vehicle in response to the optical flow within the region of interest matching a predetermined pattern of apparent motion corresponding to a connected trailer;
   wherein the region of interest is centered on the stitching interface while the speed of the vehicle is above a predefined threshold speed and the steering angle of the vehicle is less than or equal to a predefined threshold steering angle.

10. The method of claim 9, wherein the method does not determine an optical flow outside of the region of interest.

11. The method of claim 9, comprising outputting a trailer connected notification in response to determining the trailer is connected to the vehicle.

12. The method of claim 9, wherein the predefined threshold speed is 6-9 miles per hour and the predefined threshold steering angle is 4-6 degrees.

13. A camera monitoring system for a vehicle, comprising:
   a first camera and a second camera that are disposed on opposite sides of a vehicle, and have respective rear facing fields of view;
   processing circuitry configured to:
      generate a stitched video feed by stitching a first video feed from the first camera and a second video feed from the second camera together at a stitching interface to generate a stitched video feed that is panoramic and is wider than each of the first video feed and the second video feed individually;
      identify a region of interest within the stitched video feed, wherein the stitched video feed depicts a scene having a first pixel area, and the region of interest corresponds to a portion of the scene having a second pixel area that is less than the first pixel area;
      determine an optical flow within the region of interest; and
      determine that a trailer is connected to a vehicle in response to the optical flow within the region of interest matching a predetermined pattern of apparent motion corresponding to a connected trailer.

14. The camera monitoring system of claim 13, wherein:
   a horizontal width of the region of interest is less than a full horizontal width of the stitched video feed; and the region of interest includes a portion of the stitching interface.

15. The camera monitoring system of claim 13, wherein a vertical height of the region of interest is less than a full vertical height of the stitched video feed.

16. The camera monitoring system of claim 13, wherein the controller is configured to:
- determine a set of one or more operating conditions of the vehicle; and
- perform the identification of the region of interest within the stitched video feed based on the set of one or more operating conditions of the vehicle.

* * * * *